United States Patent [19]
Belsdorf

[11] 3,923,408
[45] Dec. 2, 1975

[54] MECHANISM FOR FASTENING A RING ON A SHAFT

[75] Inventor: Manfred Belsdorf, Moorbusch, Germany

[73] Assignee: TRW Inc., Cleveland, Ohio

[22] Filed: July 26, 1974

[21] Appl. No.: 492,216

Related U.S. Application Data

[63] Continuation of Ser. No. 324,783, Jan. 18, 1973, abandoned.

[30] Foreign Application Priority Data

Feb. 2, 1972 Germany.......................... 2204831

[52] U.S. Cl. ............... 403/261; 29/509; 29/526; 85/8.6; 403/273; 403/326
[51] Int. Cl.² .......................................... F16B 21/00
[58] Field of Search .......... 403/326, 261, 273, 355; 85/8.6, 7; 287/DIG. 7; 29/509, 526

[56] References Cited
UNITED STATES PATENTS

| | | | |
|---|---|---|---|
| 1,093,348 | 4/1914 | Mooers | 287/DIG. 7 |
| 1,192,404 | 7/1916 | Ewart | 403/261 |
| 3,560,124 | 2/1971 | Bergere | 85/7 |

FOREIGN PATENTS OR APPLICATIONS

| | | | |
|---|---|---|---|
| 1,232,364 | 4/1960 | France | 403/261 |

*Primary Examiner*—Werner H. Schroeder
*Assistant Examiner*—Conrad L. Berman
*Attorney, Agent, or Firm*—Ernest F. Marmorek

[57] ABSTRACT

A ring is fastened on a shaft or axle so as to secure it against a changing axial load. A closed locking ring is provided on the shaft which is permanently deformed so as to rest in an annular groove in the shaft. One face of the locking ring bears against the ring to be secured while its other face is mechanically biased against the flank of the groove. The ring to be secured, which may for example be a pinion, may rest against two locking rings. Alternatively, several grooves may be provided in the shaft for adjusting the position of the ring to be locked.

1 Claim, 2 Drawing Figures

MECHANISM FOR FASTENING A RING ON A SHAFT

This is a continuation of application Ser. No. 324,783, filed Jan. 18, 1973, now abandoned.

BACKGROUND OF THE INVENTION

The present invention relates to the fastening of a ring on a shaft or axle with respect to an axial load, the direction of which may change and particularly relates to the securing of a ball bearing, pinion, gear or the like on a shaft or of a pinion with beveled teeth on a rack linkage.

In the past, such elements have been secured by means of conical rings, spring washers, nuts or the like.

It is accordingly an object of the present invention to provide a particularly simple and secure mechanism for fastening such elements.

It is a further object of the present invention to provide such a mechanism which is secure against unintentional movement in an axial direction.

SUMMARY OF THE INVENTION

In accordance with the present invention this is achieved by providing an annular groove on the shaft immediately adjacent to the ring to be secured. A closed locking ring is caused to engage in the groove by permanently, radially deforming the ring so that it is pressed into the annular groove. As a result, one of the faces of the locking ring rests against the ring to be secured; its other face is pressed with a mechanical bias against the flank of the groove opposite the ring.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
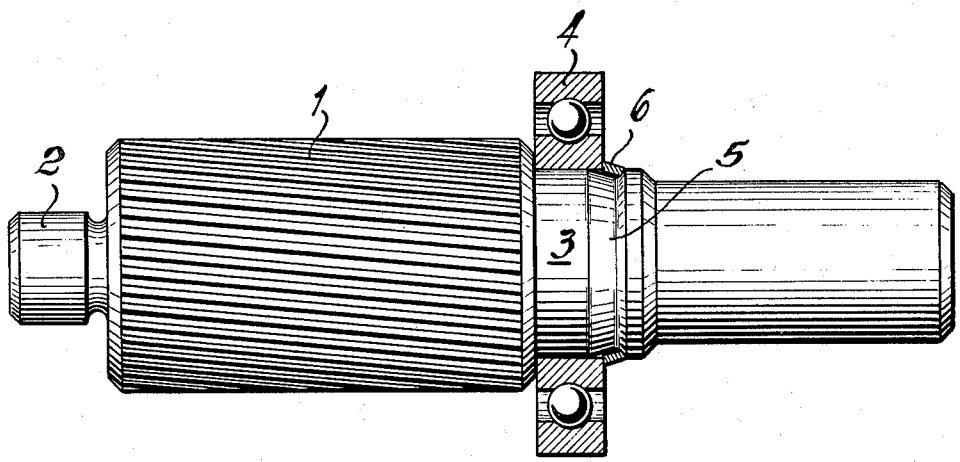
FIG. 1 is an elevational view of a roller bearing which is fastened in accordance with the present invention on the shaft of a pinion having beveled teeth.
Figure 2:
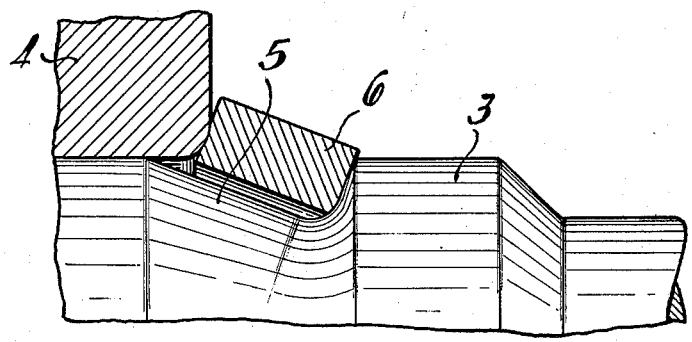
FIG. 2 illustrates a detail of the mechanism of FIG. 1 on enlarged scale, parts being shown in section.

Referring now to the drawing there is illustrated a pinion shaft. The pinion is designated by reference number 1. The shaft butts 2 and 3 are to be provided with a suitable bearing. Accordingly, a roller bearing 4 is pressed over the shaft butt 3. The roller bearing 4 is supported by the face of the pinion 1. Adjacent to the inner ring of the roller bearing 4 there is provided an annular groove 5 in the shaft butt 3. A closed locking ring 6 has an inner diameter which in its original or undeformed state is somewhat larger than the outer diameter of the shaft butt 3. Accordingly, the locking ring 6 is first pushed over the shaft butt 3 until its face bears against the inner ring of the roller bearing 4. Subsequently, it is pressed radially into the annular groove 5. This deformation may be carried out by several jaws which are moved over the locking ring 6 and are then forced radially inwardly. It is also possible to achieve a deformation by the axial movement of a conical ring. In this manner one face of the locking ring 6 rests against the inner ring of the roller bearing 4 and the other face of the ring 6 bears with a mechanical bias against the flank of the groove which is disposed opposite of the ring 4.

Accordingly, the inner ring of the roller bearing 4 is tensioned in an axial direction with respect to the shaft and is suitable for absorbing the axial forces which occur in a changing direction.

In this manner it is also feasible to secure a movable ring against a fixed collar on a shaft or axle. In accordance with the present invention it is also feasible to provide a locking ring on both sides of the ring to be fastened.

It is also feasible to provide several grooves for selectively securing a ring in various axial positions. This may also be accomplished in connection with locking rings of different widths.

As shown in the drawing, the annular groove 5 has such a conical shape that the greatest depth of the groove corresponds approximately to the thickness of the locking ring and that this depth portion of the groove is provided at the side of the nut which is away from the ring 4. In this manner the locking ring is conically deformed in such a manner that one face thereof rests against the flank of the groove while the other face thereof is supported by the ring to be secured.

What is claimed is:
1. In combination,
   a shaft;
   a fixed collar on said shaft;
   a ring on said shaft abutting with one face against said collar;
   an annular groove recessed in said shaft adjacent said collar;
   a closed locking ring having a permanent radial deformation and disposed in said annular groove in such a manner that one face of said locking ring rests against the ring to be secured while the other face of said locking ring is supported with a mechanical bias by the flank of the groove opposite the ring to be secured;
   said annular groove having a substantially conical cross-section so that the greatest depth of said groove corresponds approximately to the thickness of said locking ring, said greatest depth being disposed at the side of the groove away from the ring to be secured, said locking ring being conically deformed in such a manner that one face bears against the flank of the groove and the other face supports the ring to be secured;
   said locking ring is adapted to resist an axial load of said ring and secures said ring on said shaft.

* * * * *